(12) United States Patent
Agarwal et al.

(10) Patent No.: US 11,314,856 B2
(45) Date of Patent: Apr. 26, 2022

(54) GENERATING RULE-BASED ACCESS CONTROL POLICIES USING A BYTECODE INSTRUMENTATION SYSTEM

(71) Applicant: COLORTOKENS, INC., Santa Clara, CA (US)

(72) Inventors: Sanjay Kumar Agarwal, Santa Clara, CA (US); Somesula Pradeep Kishore, Santa Clara, CA (US); Ruchir Gupta, Santa Clara, CA (US)

(73) Assignee: COLORTOKENS, INC., Santa Clara, CA (US)

( * ) Notice: Subject to any disclaimer, the term of this patent is extended or adjusted under 35 U.S.C. 154(b) by 295 days.

(21) Appl. No.: 16/397,979

(22) Filed: Apr. 29, 2019

(65) Prior Publication Data
US 2020/0342094 A1 Oct. 29, 2020

(51) Int. Cl.
*G06F 21/00* (2013.01)
*G06F 21/54* (2013.01)
*G06F 21/60* (2013.01)
*G06F 9/445* (2018.01)

(52) U.S. Cl.
CPC ............ *G06F 21/54* (2013.01); *G06F 21/602* (2013.01); *G06F 9/445* (2013.01); *G06F 2221/033* (2013.01)

(58) Field of Classification Search
CPC ........ G06F 21/54; G06F 21/602; G06F 9/445; G06F 2221/033
USPC .......................................................... 726/1
See application file for complete search history.

(56) References Cited

U.S. PATENT DOCUMENTS

| | | | |
|---|---|---|---|
| 9,021,448 B1* | 4/2015 | Gagliardi | G06F 11/3636 717/130 |
| 9,411,591 B2* | 8/2016 | Bradbury | G06F 11/348 |
| 2001/0047510 A1* | 11/2001 | Angel | G06F 9/45516 717/128 |
| 2008/0168532 A1* | 7/2008 | Carter | G06Q 10/06 726/1 |
| 2009/0300711 A1* | 12/2009 | Tokutani | G06F 21/554 726/1 |

(Continued)

*Primary Examiner* — Josnel Jeudy
(74) *Attorney, Agent, or Firm* — Barry Choobin; Patent 360LLC (57) ABSTRACT

Instrumentation codes are inserted into predetermined portions of a bytecode. Every transaction referenced in the bytecode is virtually combined and arranged hierarchically to describe a virtual transaction stack describing the computer-based resources accessed during the transaction. Based at least on the origin of the transaction, the characteristics of the transaction and the computer-based resources accessed during the transaction, the sensitivity of the transaction, and the security context of each of the computer-based resources accessed during the transaction are determined. A policy store is searched for at least one access control policy referencing the transaction, or the computer-based resources requested accessed by the transaction. If such an access control policy is found, it is selectively modified to refer exclusively to the transaction and the corresponding sensitive computer-based resources. Otherwise, a new access control policy exclusively referencing the data-oriented transactions and the corresponding sensitive computer-based resources is created.

12 Claims, 3 Drawing Sheets

(56) References Cited

U.S. PATENT DOCUMENTS

| | | | |
|---|---|---|---|
| 2014/0109168 A1* | 4/2014 | Ashley | H04L 63/102 |
| | | | 726/1 |
| 2014/0282430 A1* | 9/2014 | Kew | G06F 11/3636 |
| | | | 717/130 |
| 2016/0196432 A1* | 7/2016 | Main | G06F 21/57 |
| | | | 726/1 |
| 2018/0159701 A1* | 6/2018 | Krause | H04L 12/4641 |
| 2019/0213109 A1* | 7/2019 | Chakra | G06F 11/3476 |

* cited by examiner

GENERATING RULE-BASED ACCESS CONTROL POLICIES USING A BYTECODE INSTRUMENTATION SYSTEM

BACKGROUND

Technical Field

The present disclosure relates to software programs used to instrument a computer-executable program code. More particularly, the present disclosure relates to software programs that facilitate the creation of rule-based access control policies applicable to the execution of the computer executable program code, based on the instrumentation of the bytecode corresponding to the computer executable program code.

Description of Related Art

Bytecode instrumentation typically involves adding statements—instrumentation codes—to a computer executable program code (referred to as 'program code' hereafter) at predetermined locations, preferably, at the beginning of a function within the program and at the end of the function, in order to monitor the performance and operational activities of the program code in run-time. The phenomenon of bytecode instrumentation is also utilized to monitor the memory read/write operations performed by the program code (during execution thereof), to identify any unauthorized memory read/write operations and to block such memory read/write operations, identified as unauthorized from being re-implemented.

Certain prior-art instrumentation solutions envisaged manually inserting the instrumentation codes (preferably using the skills and services of a computer programmer) for tracking inter-alia the memory read/write operations performed by the (corresponding) program code, and to differentiate, based on the outputs provided by the instrumentation codes, the authorized memory read/write operations from the unauthorized memory read/write operations.

However, manual insertion of instrumentation codes entails several disadvantages including the need on the part of the programmer to accurately identify the points in the program code where the instrumentation codes are to be inserted—such points typically referred to as 'instrumentation points.' Additionally, manual addition of the instrumentation codes to the program code necessitates frequent recompilation of the (source) program code and contributes directly to an increase in the time and effort required to execute the program code. Also, manual addition of the instrumentation codes requires the computer programmer to be mindful of the instrumentation codes and the instrumentation points accommodating the instrumentation codes, such that the said instrumentation codes can be readily identified—in the source program code—and removed when they are deemed unnecessary.

Another disadvantage associated with prior-art instrumentation solutions is that they envisage using instrumentation codes—software programs—heavily dependent on the source programming language used for describing the underlying source program code. For instance, a (prior-art) solution envisaging a parse tree—representative of the tokens corresponding to the memory read/write operations—is heavily dependent on the programming language used for the source code. The dependency stems out from the characteristic of the parse tree always rendered as a programmatic abstraction of the source code. Therefore, the contents of the parse tree are always dependent on the programming language and the consequential programming structure used in the (source) program code.

Further, certain prior-art instrumentation solutions also envisaged instrumenting the object code—the object code being independent of the programming language used to represent the corresponding source program code—instead of the source code itself, in order render the process of instrumentation independent of the programming language of the source program code. However, such prior-art instrumentation solutions—given the fact that they envisage modifying the object code corresponding to (a) source program code—are implementable only on the object codes that execute a predetermined target processor language. It is also possible that such prior-art instrumentation solutions are modified (rather substantially) to work with object codes executing a variety of target processor languages. However, such an effort (towards streamlining the prior-art instrumentation solutions to be compatible object codes of any target processor language) is not only cost-expensive but also laborious in terms of the time and effort needed, since object code instructions.

To overcome, at least partially, the disadvantages specified above, systems and methods that compiled (a) source program code into a machine independent language, for example, bytecode, were introduced. The bytecode is a machine-independent abstraction of the source program code which is parsed by an interpreter, albeit a machine (a computer executing the source program code) dependent interpreter, to facilitate identification and execution of the computer readable instructions incorporated within the bytecode. The use of bytecode for instrumentation was considered advantageous given the bytecode was both source code and machine independent, and also because the phenomenon of bytecode instrumentation could be effortlessly implemented on a plurality of source program code languages and a plurality of machines regardless of their functions and characteristics.

Introduced as an effective alternative to the object code, the phenomenon of bytecode instrumentation has been in use primarily as a tool for collecting a variety of data including timing data, resource-utilization data, error-log data, and the data representative of the code paths traversed by programs/routines. Given the fact the bytecode and the instrumentation thereof is source code independent and machine independent, the data collected as a part of bytecode instrumentation is usable in verifying the security-oriented parameters, i.e., the confidentiality and integrity, corresponding to the sensitive data stored and exchanged across a computer network.

Additionally the phenomenon of bytecode instrumentation is also used to track the flow of information across various endpoints of a computer network and to configure access control policies dynamically. The access control policies, when enforced provide network administrator with a bird's eye view of the information flow (across various endpoints) vis-à-vis the access privileges and security clearances associated with the endpoints. The access control policies also enable the network administrator to effectively single-out information flows involving unauthorized data exchange, and pre-empt the recurrence of such unauthorized data exchange by blocking the execution of such unauthorized information flows.

Accordingly, there is a need for a system and method that utilize the phenomenon of bytecode instrumentation to observe a pattern of information flow across predetermined endpoints of a computer network. There is also felt a need for a system and method that create access control rules governing access to the sensitive data stored across the said computer network and iteratively tweak the access control rules (governing access to the sensitive data) based on the observed pattern of information flow, to not only suit the context associated with the information flow but to also maintain the integrity of the sensitive data.

OBJECTS

An object of the present disclosure is to envisage a computer-implemented method and system that incorporates dynamic access control policies configurable at run-time, and executable nearly concurrently with the execution of data-oriented transactions requesting access to predetermined computer-based resources.

Another object of the present disclosure is to envisage a computer-implemented method and system that checks for the availability of access control rules appropriate for controlling the execution of a transaction and dynamically tweaks an existing access control rule in an event no appropriate rule is deemed available.

One more object of the present disclosure is to envisage an add-on access control mechanism that could be seamlessly integrated into an existing application program.

Another object of the present disclosure is to envisage a machine-independent and source program code independent access control mechanism.

Still, a further object of the present disclosure is to envisage a computer-implemented method and system exhibiting a granular approach for implementation of access control policies on data-oriented transactions.

Another object of the present disclosure is to envisage a computer-implemented system and method that provides for access control policies to be configured at the level of a data-oriented transaction, instead of an application level and facilitates the implementation of granular access policies applicable to individual data-oriented transactions.

Another object of the present disclosure is to envisage a computer-implemented system and method that blocks individual data-oriented transactions violating an access control policy, without affecting the execution of the remaining data-oriented transactions determined to be in-line with the said access control policy.

One more object of the present disclosure is to envisage a low latency computer-implemented system and method that instruments only the boundary points of data-oriented transactions and thereby reduces the processing overheads typically associated with instrumenting a source program code in its entirety.

SUMMARY

The present disclosure envisages a computer-implemented system, method and a computer program product for instrumenting a (computer) program code and generating rule-based access control policies based on the instrumented program code. Digressing to the method envisaged by the present disclosure, the said method is executed preferably in parallel to be the launch of the program code designated to be instrumented. Since a typical source program code may contain a plurality of routines and sub-routines arranged across a plurality of files, the plurality of files may be packaged together before the compilation thereof. Preferably, an intermediary class file corresponding to the source program code is created. The source program code, post compilation by a predetermined compiler, is converted into a standardized portable binary format represented typically as a 'class' file (intermediary class file). The intermediary class file represents each of the routines and sub-routines of the source program code in the standardized portable binary format typically termed as the bytecode.

Subsequently, instrumentation points, i.e., the locations across the bytecode (corresponding to the source program code) are identified for insertion of predefined instrumentation code thereto. Typically, an instrumentation code incorporates (computer-executable) instructions usable for obtaining data information about the events and operations (inter-alia) that normally occur during the execution of a source program code. Typically, the number of instrumentation points and the location of each of the instrumentation points (across the bytecode) is selected based at least on the number of threads of execution necessary for executing the bytecode and also based on the direction of (execution) flow associated with each of the threads of execution. However, it is preferable that an instrumentation point is situated both at a point where the execution of every routine (incorporated within the source program code) begins, i.e., preferably at the beginning of a thread executing the routine, and at the end of the execution of the thread executing the said routine, thereby providing for tracking and monitoring of all the events/operations occurring between the beginning and end of every routine (incorporated within the source program code) to be effectively tracked.

After the identification of the instrumentation points, the instrumentation code is inserted into each of the instrumentation points. Preferably, the instrumentation point located at the end of a routine (thread) is used only as a marker to denote the end of the routine and in turn the corresponding thread, and consequentially no information about the event/operations performed during the execution of the routine is collected via the instrumentation point located at the end of the routine. Insertion of the instrumentation code into the identified instrumentation points of each of the routines facilitates tracking and monitoring of at least the flow of execution of each of the routine, in addition to the identification of routine execution time, time stamps relevant to each of the routines, values of various machine-state variables altered as a consequence of execution of the routines, time-stamped indications of calls to other routines (both user-defined routines and system routines) inter-alia.

The flow of execution associated with each of the routines of the source program code is preferably represented as a 'virtual transaction stack.' Preferably, the execution of each of the routines and consequentially the corresponding flow of execution of each of the routines is divided into a plurality of interrelated transactions. Consequentially, tracking each of the transactions provides in overview of how the corresponding routines under execution behave when executed, and also provides for a detailed understanding of the flow of execution including the methods called (during the execution of the routine), the databases and the servers accessed (during the execution of the routine), type and sensitivity of the information accessed by the routine under execution, the variables manipulated by the routines, time taken for execution of each of the routines, number of times a particular routine called another routine, data exchanged between the routines and the like.

Subsequently, a virtual transaction stack describing the execution flow of each of the routines and detailing the operations performed and the events executed across every transaction performed during the execution of each of the threads is created. The virtual transaction stack, in accordance with the present disclosure, is a so configured to demarcate, based on the transactions identified as a part of the execution of each of the routines, the boundaries for each of the said transactions (transactional boundaries), and consequentially the boundaries for each of the routines.

Essentially, transactional boundaries are the points at which the execution of routines (thread)—begin and end respectively. Based on an analysis of the identified transactional boundaries, the (computer-based) resources accessed by each of the transactions and in turn, each of the routines and the sensitivity of each of the resources is also determined. Preferably, a computer-based resource is deemed sensitive either based on the nature of data stored therein or based on the access privileges associated with the resource or a combination of both. Further, the transactions which operate upon computer-based resources deemed sensitive are also categorized as sensitive transactions.

The method envisaged by the present disclosure emphasizes on the need to track and monitor access requests directed to computer-based resources deemed sensitive such that the said sensitive computer-based resources could be rendered accessible in a selective manner and on a strict need-based manner, with the access requests directed to such sensitive computer-based resources governed by dynamically configured access-policy rules. Additionally, the method envisaged by the present disclosure also generates information about the pattern of access to sensitive computer-based resources, thereby allowing a system administer to either dynamically create relevant access-control policies or at least dynamically tweak the existing access-control policies such that the access requests directed to sensitive computer-based resources are selectively allowed taking into consideration the sensitivity of the data stored (in the said computer-based resources), as well as the need on the part of a requesting transaction—identifiable and understandable subsequent to an analysis of the corresponding transaction stack—to gain access to the requested sensitive data.

In accordance with the present disclosure, the information generated as a consequence of instrumentation of the source program code, i.e., the information corresponding to the execution sequence of each of the transactions of the source program code, is provided to a computerized policy control module that uses the said information as a basis to create access control policies which, upon execution (preferably by the policy control module), track the subsequent implementations of the transactions (of the computer program code), and provide the said transactions with selective and controlled access to predetermined computer-based resources, based on the rules prescribed by the access control policies. Additionally, the information (corresponding to the execution sequence of each of the transactions of the source program code) is also tendered accessible to a network administrator, who could, in turn use the said information as a basis for creating and subsequently enforcing, preferably dynamically, the access control policies which provide the said transactions (constituted within the source program code) with selective and controlled access to the predetermined computer-based resources.

DETAILED DESCRIPTION

The present disclosure envisages a computer-implemented method, a corresponding (computer-implemented) system and a computer program product for instrumenting a source program code (typically, computer-executable software program code) and generating rule-oriented access control policies based on the information obtained as a consequence of instrumenting the source program code. Typically, in addition to facilitating creation of rule-based access control policies, the phenomenon of instrumentation of source program code also facilitates alteration/modification of the source program code, without affecting firstly the course of execution of the source program code and secondly the purported output of the software program code, such that certain diagnostic and statistical information could be obtained dynamically during the execution of the software program code. Further, the phenomenon of instrumentation also facilitates a close and dynamic monitoring of the internal state of the software program code for inter-alia identifying and diagnosing run-time errors, detailing the execution of the software program code, measuring the efficiency of execution of the software program code, performing code coverage analysis, performance profiling and facilitating additional run-time error handling.

Additionally, the phenomenon of instrumentation also provides for the bytecode to be examined, albeit in a static manner (i.e., static analysis) for deriving a variety of information including but not restricted to code metrics, complexity analysis, usage information (for example, library usage), and debugging. Further, the phenomenon of instrumentation also makes it possible for certain run-time errors, which are nearly unidentifiable via the static analysis, to be detected since there is no guarantee that the entire software program code would be executed every time it is launched. The run time errors including improper functional parameter lists, use of uninitialized variables and the like could also be detected by bytecode instrumentation.

In accordance with the present disclosure, the term 'source program code' denotes computer program code executable on a computer-based device having a processor, an input unit such as a mouse and a keyboard, an output unit such as a display monitor. Preferably, the processor embodied within the computer-based device is pre-configured to execute the source program code and display the output of the execution of the source program code on the display unit. Typically, the computer-based device also enables the user to interact with the processor and influence the execution of the source program code and consequentially the output purported to be displayed on the output unit, by providing the inputs—additional or supplemental program instructions necessary for the execution of the source program code—via the input unit.

In accordance with the present disclosure, in order to instrument the source program code, the processor initially examines the source program code and subsequently triggers a pre-determined compiler, for example, a Java® compiler, for compiling the source program code, and in the process generating a byte code corresponding to the source program code. Since the bytecode corresponding to the source program code is executed in a virtual machine, and within a virtual environment, the present disclosure exemplifies the implementation of a Java® compiler and a Java Virtual Machine (JVM).

As exemplified above, the Java® compiler, by way of compiling, converts the data representing the source program code into data representing a bytecode, using well-known compilation procedures. Preferably, the bytecode is both source (programming) language independent as well as target machine (processor) independent such that the bytecode corresponding to a source program code writer in a first programming language is programmatically equivalent to the bytecode generated for the same source program code written in a second programming language.

Figure 1A:
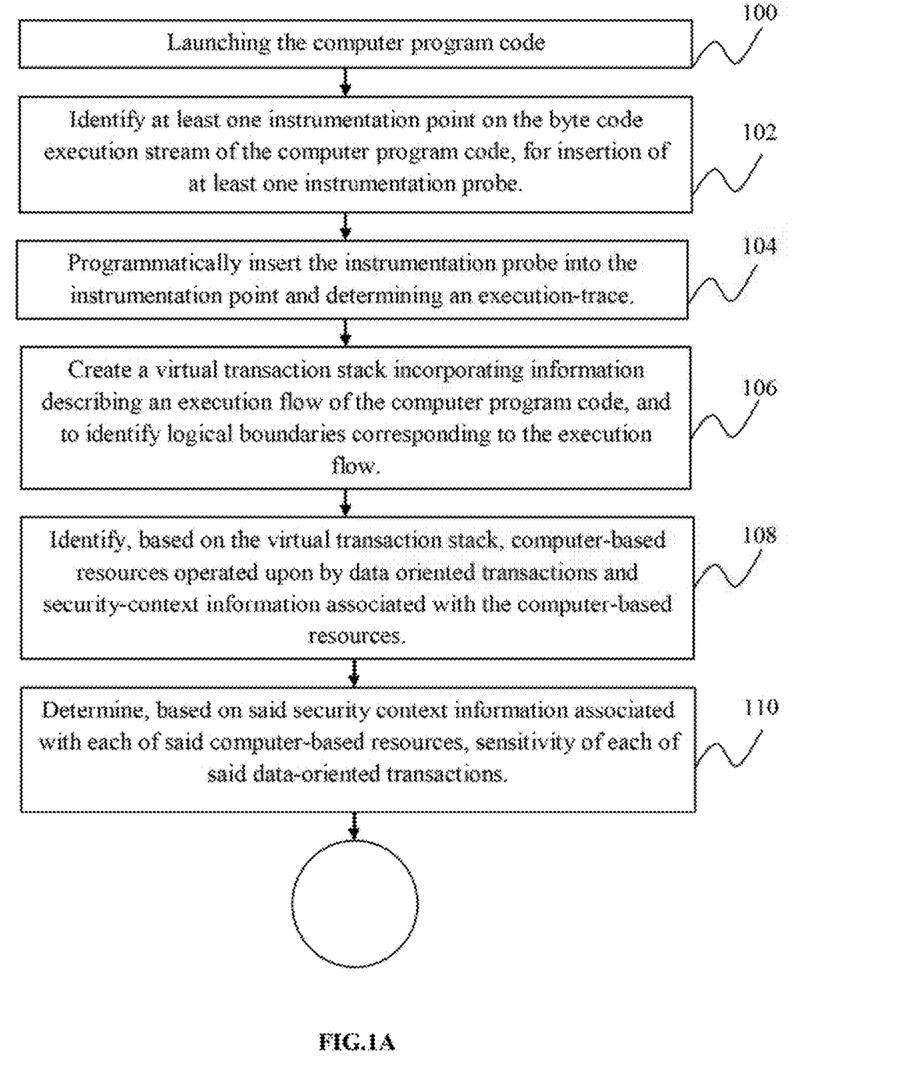
FIG. 1A and FIG. 1B in combination illustrate a flowchart that describes the steps included in the (computer-implemented) method for instrumenting a bytecode and generating rule-oriented access control policies based thereupon.
Figure 1B:
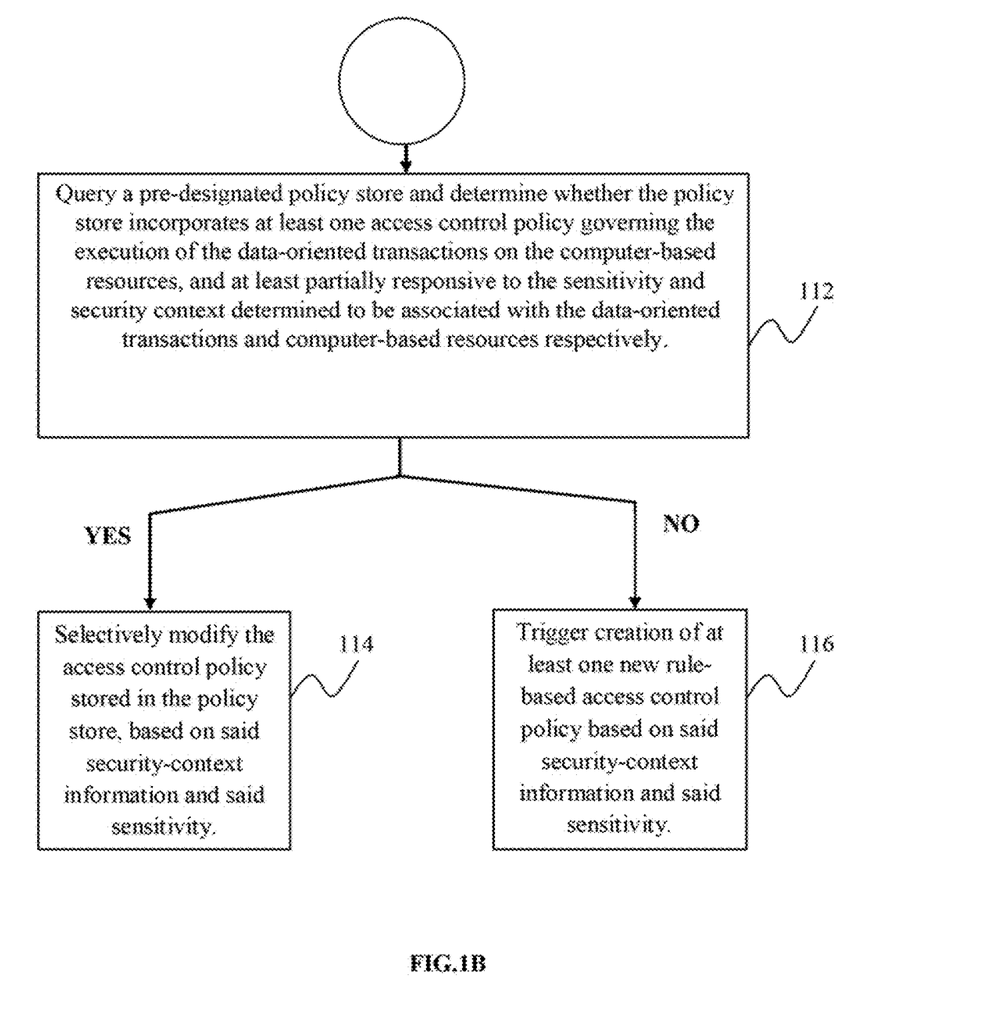

Referring to FIG. 1A and FIG. 1B in combination, there is shown a flowchart illustrating the steps included in the computer-implemented method for instrumenting a bytecode and generating rule-oriented access control policies based on the information elicited from the instrumented bytecode. The execution of the method envisaged by the present disclosure begins at step 100 when the source program code forming at least a part of a distributed (software) application is launched on a predetermined computer-based device preferably connected to a (predesignated) computer network. As described above, the computer-based device incorporates an exemplary Java® compiler for compiling the source program code into bytecode, and an exemplary Java Virtual Machine (JVM) for executing and instrumenting the bytecode. Preferably, when the source program code is launched, the processor embodied within the computer-based device triggers a compiler, for example, a Java® compiler to compile the source program code. Preferably, as a result of compilation, the source program code is converted into a non-textual binary format referred to as the bytecode (in this case the Java® bytecode). Preferably, the bytecode thus generated is represented as an intermediary class file having a file name ending with a .class extension.

Subsequently, at step 102, the processor (embodied within the computer-based device) examines the generated bytecode (by reading the intermediary class file incorporating the bytecode) and identifies the portions of the bytecode most appropriate for instrumentation. Preferably, the portions of the source program code deemed most appropriate for instrumentation include a method entry, a method exit, a throw, and a method call. In accordance with the present disclosure, the portions deemed most appropriate for instrumentation, i.e., the method entry, method exit, throw, and method call are termed as instrumentation points. Preferably, instrumentation points are always construed as an associated (interrelated) pair, i.e., an instrumentation point located at a particular method entry would always have a corresponding complementary instrumentation point located at the said method exit.

Preferably, the source program code is instrumented by way of inserting the instrumentation code, also referred to as instrumentation probes (computer-executable instructions programmed to facilitate instrumentation of the source program code), at the pre-designed instrumentation points. Preferably, the instrumentation probes when inserted into the corresponding instrumentation points and executed implement certain pre-programmed runtime instrumentation functions that in turn pass parameters indicative of the portions (of the source program code) being instrumented. Preferably the instrumentation probes indicate a line number of the source code corresponding to the portion being instrumented. Additionally, the instrumentation probes also generate a 'thispointer'—pointer to an address where data for an object is stored—indicating the method (incorporated within the source program code) being instrumented.

Preferably, the instrumentation probes are injected at the beginning of every class or every method incorporated within the source program code. Typically, each of the instrumentation probes collects—based on the instrumentation of the source program code—information about the functionality provided by the instrumented class or method, and the runtime data processed by the class or the method. Typically, instrumenting a class or a method yields three categories of information including the parameters returned to the class (or the method), the result returned by the class (or the method), and runtime instance of the method or the object of the class. For example, an instrumentation probe inserted at the beginning of the method prepareCall (String SQL) implemented on the Connection interface in Java®, elicits a runtime Connection object, and the parameters passed by the method prepareCall to the Connection interface (for the execution of the method), i.e., the SQL string passed by the method prepareCall. Further, another complementary instrumentation probe inserted at the end of the method prepareCall to the Connection interface elicits the result of the execution of the method with the SQL statement as the input parameter the result of the execution of the method or the return value of the method being the preparedStatement object. Additionally, the instrumentation probes inserted at the beginning and end of the method prepareCall, in combination with predetermined Java® Reflection adapters, also elicit the runtime values assigned to the Connection object and the preparedStatement object.

Preferably, in addition to implementing certain pre-programmed runtime instrumentation functions that in turn pass parameters indicative of the portions (of the source program code) being instrumented, the instrumentation probes, and in the aforementioned case the instrumentation probes inserted at the beginning as well the end of a method call, while working in combination complementing one another generate information corresponding to at least the type of objects being created, the runtime values of each of the objects, the parameters passed by the method and worked upon by the objects, and the result of execution of the method. Preferably, instrumentation probes—complementary instrumentation probes—are inserted at the beginning and the end of every method or every class incorporated within the source program code, in order to elicit the information indicating at least the objects being created (by each of the methods/classes), the runtime values of each of the objects, the parameters passed by each of the methods and worked upon by the objects, and the end result of execution of each of the methods/classes.

In accordance with an exemplary embodiment of the present disclosure, during the execution of a typical source program code on a computer-based device, when a user clicks on a hyperlink displayed as a part of the execution of the source program code and requests certain information from a server represented by and reachable via the said hyperlink, the request from the user is transmitted across a computer network to the relevant server hosting the service. Preferably, the moment when a request from the user's computer-based device traverses the computer network and reaches the server is considered as the beginning (i.e., the entry point) of a data-oriented transaction that could be instrumented. As used herein, the term 'data-oriented transaction' refers to transactions executed upon/directed to predetermined computer-based resources (for example, database servers) for data access, data retrieval and data update. Preferably, any computer-based transaction that results in modification of (existing) data, transfer of data, creation of data, analysis/processing of data is termed as a data-oriented transaction.

Preferably, at the server, the user's request processed by a Java Virtual Machine (JVM) incorporated within a Java® container. The Java Virtual Machine, on its part, preferably interacts with a plurality of relevant classes or methods, executes necessary business logic (possibly embodied within the relevant classes/methods), interacts with a plurality of relevant external services including but not restricted to external databases, external services and external files (preferably stored on third-party servers) using necessary communication protocols (including HTTP, HTTPS, FTP, Sockets and the like), before generating—as a consequence of the aforementioned functions and interactions—a response in-line with the user's request, and transmitting the said response back via the communication network to the user's computer-based device. Preferably, the entire flow—from the moment the user's request is processed at the server to the moment when the response is transmitted from the server to the user's computer-based device—is captured using the respective instrumentation probes as explained in the earlier paragraphs, and is described as constituting a transaction. Subsequently, every such transaction occurring during the execution of the source program code, and identified, at least in part, based on the information elicited from the respective instruction probes, is virtually combined and arranged hierarchically to describe a virtual transaction stack (step 104). Typically, in a scenario where transactions span across multiple Java Virtual Machines (JVMs), an account of accessing services deployed across multiple JVMs, transactions are differentiated based on the JVMs associated therewith, and consequentially a transaction element is generated for every transaction executed at every JVM. Subsequently, transactions executed by respective JVMs are correlated using a predetermined correlation strategy, and a unified transaction stack describing the transaction elements corresponding to each of the plurality of JVMs is created.

Another exemplary embodiment of the present disclosure describes a web-based banking service executed as a Java® application and on a Tomcat server. Typically, every Java® application includes an application entry point, i.e., a Java® application class usable for launching the Java® application. The web-based banking service consults an H2® database in addition to using the Apache® HTTP Client library to make external service calls and the Oracle® Java® Database Connectivity (Oracle® JDBC) driver library to interact with an Oracle® Database Server. Preferably, the Apache Tomcat® server incorporates a servlet container which delegates any HTTP requests and REST API calls arising out of the execution of the banking service, onto the corresponding application classes. Further, the H2® database serves as an in-memory relational database accessible via a corresponding JDBC® driver implementing JDBC® specifications. On similar lines, the banking service interacts with the Oracle® JDBC® driver library (to interact with the Oracle® Database Server) implementing JDBC® specifications. Preferably, the Apache Tomcat® server, the H2® database, and the Oracle® Database Server are executed by a standalone Java Virtual Machine (JVM) that also houses the Apache® HTTP Client library and the Oracle® JDBC® driver library. Preferably, a JVM process manages the execution of the Tomcat server, the H2® database, and the Oracle® Database Server, in addition to managing the Apache® HTTP Client library and the Oracle® JDBC® driver library.

Preferably, in accordance with the present disclosure, instrumentation probes are inserted into the JVM process, the servlet container, the Java® application class (entry point to the Java® application) and Java® implementation class inter-alia. Preferably, the instrumentation probes inserted onto the JVM process elicit details about the JVM process including but not restricted to the IP address, the port, JVM version, files accessed by the JVM, and the sockets opened by the JVM. Further, the instrumentation probes inserted into the Java® application class serving as an entry point to the Java® application executing the web-based banking service, elicit information including the Open Web Application Security Protect (OWASP) vulnerabilities which in turn include the well-known SQL injection flaws, broken authentication and session management, cross-site scripting, insecure direct object reference, security misconfiguration, sensitive data exposure, missing function level access control, cross-site request forgery, use of components with known vulnerabilities, and non-validated redirects and forwards. Additionally, the instrumentation probes inserted into the Java® application class also elicit information representative of the interaction (of the Java® application class) with external resources such as third-party files and sockets. Further, the instrumentation probes inserted into the servlet container and in turn into the servlet framework elicit information corresponding to the servlet including the session ID, request parameters, HTTP headers and the like. Further, the instrumentation probes inserted onto the Java implementation class (i.e., java.sql.connection) monitor the corresponding JDBC® framework and in turn elicit from the JDBC® framework information including the name of the database consulted by the Java® application, parameters for the connection the Java® application and the databases, port, hostname and the like.

In accordance with an exemplary embodiment of the present disclosure, an exemplary 'deposit' action initiated by a user via the web-based banking service executed as a Java® application, is used as a basis for describing the manner in which the entire 'deposit' action performed upon the Java® application is instrumented and consequentially represented as a virtual transaction stack. Essentially, the virtual transaction stack describes all the transactions occurring across, for example, a Java® application, and defines the boundaries for each of the transactions including at least the point (in the Java® application) where the transaction begins, the point where the transaction terminates, and the point where the data (processed/acted upon during the course of execution of the transaction) is committed (saved on) to a database.

Preferably, soon after being invoked by the user, the 'deposit' action is processed firstly by the servlet. The servlet subsequently validates the user credentials by comparing the user identification data (such as the user name and the password) with the data stored in the H2® database. Additionally, the servlet elicits the user account information preferably from the H2® database. Further, the servlet also accesses third-party services such as the 'fraud detection external service' before updating the transaction log corresponding to the 'deposit' transaction initiated by the user. Referring again to the exemplary 'deposit' action initiated by the user, a variety of information could be elicited from the various instrumentation probes inserted into the methods (method entries and method exits) or the classes created during the execution of the 'deposit' transaction. For instance, for any service request generated by the user (in this case, the service request related to the 'deposit' action), a method termed 'service (request, response)' is executed at first by the servlet. As described above, the 'service' method implements a 'request' and 'response' paradigm, with the 'request' object containing information about the service request, including the parameters to be used tor executing the 'service' method. Similarly, the 'response' object returns the information generated as a consequence of the execution of the 'service' method, to the user.

Typically, an instrumentation probe (for example, a servlet probe) is inserted at the beginning of the 'service' method thereby marking an entry point, and consequentially the beginning of a transaction (corresponding to the 'deposit' action implemented as a Java® application). Subsequently, the instrumentation probe elicits information including but not restricted to user ID, session ID, and JavaScript® Object Notation (JSON) token, from the 'request' object. Additionally, the instrumentation probe inserted into the 'service' method also elicits, from the 'request' object the information such as the IP address from where the request originated, hostname of the agent that sent the request, the attributes of the request, port number on which the request was received, hostname of the server that received the request, the scheme of the URL (i.e., HTTP or HTTPS or FTP) used in the request, the headers received in the request, the protocol of the request, names of the parameters to the 'request' object, and the values of the parameters of the 'request' object. Typically, the information elicited by the instrumentation probe inserted into the 'service' method, i.e., the information including the user ID, session ID and JavaScript® Object Notation (JSON) token, the IP address from where the request originated, hostname of the agent that sent the request, the attributes of the request, port number on which the request was received, hostname of the server that received the request, the scheme of the URL (i.e., HTTP or HTTPS or FTP) used in the request, the headers received in the request, the protocol of the request, names of the parameters to the 'request' object, and the values of the parameters of the 'request' object, constitute a first transactional element corresponding to the 'deposit' action.

In accordance with the present disclosure, the execution of the 'service (request, response)' method also necessitates a plurality of function calls to be placed for plurality of methods including but not restricted to 'execute (SQL statement)' method, 'execute (HTTPUriRequest)' method and 'write (bytes [ ] b) method', spread across various Java implementation classes. Typically, the implementation and execution of the aforementioned methods, i.e., 'execute (SQL statement)', 'execute (HTTPUriRequest)' and 'write (bytes [ ] b)' is carried out as an extension of the execution of the 'service' method and is also directly dependent on the execution of the 'service' method. Accordingly, the execution of the 'service', 'execute (SQL statement)', 'execute (HTTPUriRequest)' and 'write (byte [ ] b)' in combination constitute an execution flow corresponding to the implementation of the 'deposit' action on the web-based banking service executed as a Java® application.

Preferably, during the execution of the method 'execute (SQL statement), an instrumentation probe (for example, an SQL statement probe) is inserted at the beginning of the 'execute (SQL statement)' method. Subsequently, the instrumentation probe inserted into the beginning of the method 'execute (SQL statement)' elicits the information indicative of the SQL statement passed as an input and the resultant of the execution of the SQL statement. Further, the information elicited from the instrumentation probe inserted into the 'execute (SQL statement)' method, i.e., the SQL statement, and the message written into a file or read from a file as a result of the implementation of the SQL statement constitute a second transactional element corresponding to the implementation of the 'deposit' action on the web-based banking service executed as a Java® application.

Preferably, during the execution of the method 'execute (HTTPUriRequest)', an instrumentation probe (for example, a HTTP Client probe) is inserted at the beginning of the 'execute (HTTPUriRequest)' method. Subsequently, the instrumentation probe inserted into the beginning of the method 'execute (HTTPUriRequest)' elicits the information indicative of the requested Uniform Resource Indicator (URI), the type of the URI (relative URI or absolute URI). Further, the information elicited from the instrumentation probe inserted into the 'execute (HTTPUriRequest)' method, i.e., the requested URI and the type of the URI constitute a third transactional element corresponding to the implementation of the 'deposit' action on the web-based banking service executed as a Java® application.

Preferably, during the execution of the method 'write (bytes [ ] b)', an instrumentation probe (for example, a File system probe) is inserted at the beginning of the 'write (bytes [ ] b)' method. Subsequently, the instrumentation probe inserted into the beginning of the method 'write (bytes [ ] b)' elicits the information indicative of the number of bytes written into an output file, the filename (of the output file), and the output stream written into the output file. Further, the information elicited from the instrumentation probe inserted into the 'write (bytes [ ] b)' method, i.e., number of bytes written into an output file, the filename (of the output file), and the output stream written into the output file constitute a fourth transactional element corresponding to the implementation of the 'deposit' action of the web-based banking service executed as a Java® application. Finally, post the completion of the execution of the methods 'execute (SQL statement)', 'execute (HTTPUriRequest)' and 'write (bytes [ ] b),' the execution of the 'service' method is also ended. Preferably, the end of the execution of the 'service' method marks an exit point and consequentially indicates the end of the transaction corresponding to the execution of the 'deposit' action on the web-based banking service implemented as a Java® application. Typically, an instrumentation probe—configured not to elicit any information corresponding to the execution of the 'deposit' action—is inserted at the exit point of the transaction in order to only mark the end of the transaction, and to terminate the virtual transaction stack describing the transactional elements representative of the implementation of the 'deposit' action on the web-based banking service executed as a Java® application.

As described above, the transaction elements—the first transactional element, second transactional element, third transactional element, and forth transactional element—corresponding to the 'deposit' action initiated by the user via the web-based banking service executed as a Java® application, are metamorphosed into the virtual transaction stack (step 104). Preferably, the virtual transaction stack describes, in a hierarchical manner, the entry point for the 'deposit' action, the first transactional element generated as a consequence of execution of the 'service' method, the second transactional element generated as a consequence of execution of the 'execute (SQL statement)' method, the third transactional element generated as a consequence of execution of the 'execute (HTTPUriRequest)' method, the fourth transactional element generated as a consequence of execution of the 'write (bytes [ ] b)' method, and the endpoint for the 'deposit' action.

In accordance with the present disclosure, the virtual transaction stack and in turn the first transactional element, second transactional element, third transactional element and forth transactional element present within the virtual transaction stack describe at least the boundary points of a transaction, i.e., the point where a transaction begins and the point where the transaction terminates. Additionally, the first transactional element, second transactional element, third transactional element and forth transactional element, when analyzed either individually or in combination, depict, inter-alia, the user ID, session ID and Java Script Object Notation (JSON) token, the IP address from where the request originated, host name of the agent that sent the request, the attributes of the request, port number on which the request was received, host name of the server that received the request, the scheme of the URL (i.e., HTTP or HTTPS or FTP) used in the request, the headers received in the request, the protocol of the request, names of the parameters to the 'request' object, the values of the parameters of the 'request' object, SQL statement passed as an input, the message written into a file or read from a file as a result of the implementation of the SQL statement, the requested URI and the type of the URI, number of bytes written into an output file, the filename (of the output file), and the output stream written into the output file.

In accordance with the present disclosure, the virtual transaction stack—constituting the first transactional element, second transactional element, third transactional element and forth transactional element—is analyzed (preferably by a processor) to determine firstly the origin of the request that prompted the execution of the transaction represented by the virtual transaction stack. The origin of the request is identified preferably based on an analysis of the information indicative of the user ID, session ID and JavaScript® Object Notation (JSON) token, the IP address from where the request originated. As described earlier, the information used for determining the origin of the request is obtained based on the analysis of the first transactional element of the virtual transaction stack, which in turn is created based on the instrumentation of the 'service' method invoked via the implementation of the 'deposit' action on the web-based banking service executed as a Java® application.

Secondly, the virtual transaction stack is further analyzed also to determine the characteristics of the request that prompted the execution of the transaction represented by the virtual transaction stack. Preferably, the characteristics of the request are identified based on an analysis of the information indicative of the scheme of the URL used in the request (either HTTP or HTTPS or FTP), the headers received in the request, the request parameters, names and values of the parameters constituting the request, the SQL statement executed as a part of the request, the database columns accessed and manipulated by the SQL statement, and the resultant of the execution of the SQL statement, i.e., the data written into a file or read from a file as a consequence of the SQL statement forming a part of the request. As described earlier, the information used to determine the characteristics of the request is obtained based on the analysis of the first transactional element and the second transactional element of the virtual transaction stack, which in turn are created based on the instrumentation of the 'service' method and the 'execute (SQL statement)' method invoked via the implementation of the 'deposit' action on the web-baaed banking service executed as a Java® application.

Thirdly, at step 106, the virtual transaction stack is further analyzed to determine the computer-based resources, i.e., at least the databases, servers, Universal Resource Indicators and files, accessed during the processing of the request and the creation of a subsequent response corresponding to the request. Preferably, the computer-based resources are identified based on an analysis of the information indicative of the port number on which the request was received, hostname of the server that received the request, the SQL statement executed as a part of the request, the database columns accessed and manipulated by the SQL statement, the message written into a file or read from a file as a result of the implementation of the SQL statement, the requested URI and the type of the URI, number of bytes written into an output file, the filename (of the output file), and the output stream written into the output file. As described earlier, the information used to determine the computer-based resources accessed during the processing of the request and the creation of a subsequent response corresponding to the request, is obtained based on a combined analysis of the first transactional element, the second transactional element, the third transactional element and the fourth transactional element of the virtual transaction stack, which in turn are created based on the instrumentation of the 'service' method, the 'execute (SQL statement' method, the 'execute (HTTPUriRequest)' method and the 'write (bytes[ ] b)' method invoked via the implementation of the 'deposit' action on the web-based banking service executed as a Java® application.

In accordance with the present disclosure, at step 108, based at least on the origin of the request (that prompted the execution of the transaction represented by the virtual transaction stack), the characteristics of the said request, and the computer-based resources accessed during the processing of the request and the creation of a subsequent response corresponding to the request, the sensitivity of the transaction (and in the context of the exemplary embodiment the transaction that was triggered in response to the initiation of the 'deposit' action on the web-based banking solution implemented as a Java® application) represented as the virtual stack is determined. In addition to determining the sensitivity of the transaction, the sensitivity of the computer-based devices access during the implementation of the transaction is also determined. The term 'sensitivity of transaction' in the context of the present disclosure describes a transaction whose access is strictly governed by predefined access control policies, the contravention of which would lead to inter-alia a loss of data integrity and the confidentiality. Likewise, the term 'security context of the computer-based resources' indicates the use of pre-determined access control policies to provide said computer-based resources with restricted, controlled access. Preferably, the security context (to be) associated with the computer-based resources is determined at least partially based on the sensitivity of the information stored therein. It is implied, within the context of the present disclosure, that any computer-based resource storing sensitive data/information is also categorized as a sensitive resource.

In accordance with the present disclosure, the information indicative of the user ID, session ID and JavaScript® Object Notation (JSON) token, the IP address from where the request originated, hostname of the agent that sent the request, the attributes of the request, the scheme of the URL (i.e., HTTP or HTTPS or FTP) used in the request, the headers received in the request, the protocol of the request, names of the parameters to the 'request' object, the values of the parameters of the 'request' object, SQL statement passed as an input, the message written into a file or read from a file as a result of the implementation of the SQL statement, is used as a basis to determine the sensitivity of the corresponding transaction. Further, information such as the hostname of the server that received the request, the scheme of the URL (i.e., HTTP or HTTPS or FTP) used in the request, the requested URI and the type of the URI, are used preferably as a basis to determine the sensitivity of the computer-based resources, for example, the databases, servers, Universal Resource Indicators and files accessed during the course of implementation of the transaction. In accordance with the present disclosure, it is also possible that some of the aforementioned information, i.e., the hostname of the server that received the request, the scheme of the URL (i.e., HTTP or HTTPS or FTP) used in the request, the message written into a file or read from a file as a result of the implementation of the SQL statement, the IP address from where the request originated are used to determine the sensitivity of both the (data-oriented) transaction as well as the computer-based resources accessed during the course of implementation of the (data-oriented) transaction.

Preferably, the 'sensitivity' of the data-oriented transactions is determined based on whether a particular data-oriented transaction, upon implementation, is triggered to either access or modify information/data that is considered proprietary to an entity/organization and preferably includes details associated with assets of an organization entity such as (but not restricted to) projects under development, project identifiers, financial information, and filenames. Likewise, any computer-based resources storing information proprietary in nature (including information corresponding to projects under development, project identifiers, financial information, filenames) are considered as 'sensitive', and access to such sensitive computer-based resources is often controlled via a plurality of pre-configured cryptographic functions that define the security context of the (corresponding) sensitive computer-based resources. In the context of the present disclosure, sensitive computer-based resources are computer-based devices (denoted by reference numeral 202 in FIG. 2) storing or facilitating access to sensitive data.

It is pertinent to note that the use of the hitherto described information for determining the sensitivity of the transaction as well as the computer-based resource accessed during the implementation of the transaction is to be construed only at an exemplary sense and not as a limitation. For those who are reasonably skilled in the art, it is apparent that certain types of information are predominantly used for determining the sensitivity of the transactions whereas certain other types of information are predominantly used determining the sensitivity of the computer-based resources (per se) accessed during the course of implementation of the transaction. Further, those who are reasonably skilled in the art would also appreciate the fact that some of the information described above could be used, rather interchangeably, for determining the sensitivity of the transaction as well as the sensitivity of the computer-based resources accessed during the implementation of the transaction.

In accordance with the present disclosure, at step 110, after determining the sensitivity of the transaction, the security-context of each of the computer-based resources accessed during the implementation of the transaction is analyzed. Preferably, the security context associated with each of the computer-based resources describes at least the user identifiers (user IDs) and the user roles allowed access to the computer-based resources, given the sensitivity of the information accessible via the said computer-based resources. Conversely, a sensitive transaction, rather a sensitive data-oriented transaction implies that such a transaction is to be facilitated by computer-based device in-line with the predetermined security context. Essentially, the security context associated with the computer-based resources dictates inter-alia the data-oriented transactions allowed to access and operate upon the information stored in the said computer based resources, the access privileges to be accorded to the said data-oriented transactions in order to be eligible to access the said computer-based resources, and the user roles eligible for initiating the said data-oriented transactions directed to the said computer-based resources.

In accordance with the present disclosure, the security context associated with each of the computer-based resources preferably triggers the execution of predetermined, exemplary cryptographic functions that, on implementation, enhance the security for the (corresponding) computer-based resources. Preferably, the cryptographic functions include but are not restricted to authentication, digital signatures, verification, encryption, and decryption. Preferably, any data-oriented transaction requesting access to any of the computer-based resources is to be authenticated before provided with access to the requested computer-based resource. For example, the data-oriented transaction can be authenticated on the basis of the combination of an 'origin' of the data-oriented transaction (i.e., a computer-based device from which the data-oriented transaction originated), the access privileges associated with the 'origin,' and the user roles authorized to access the 'origin' and trigger implementation of the said data-oriented transaction.

In accordance with the present disclosure, at step 112, a policy store pre-configured to store (a plurality of) access control policies is triggered, and a look-up operation is performed among the access control policies stored within the said policy store, for identifying at least one access control policy that references, either partially or entirely, either the data-oriented transactions or the computer-based resources requested access to, by the said data-oriented transactions. Essentially, the look-up operation is also performed with a view of eliciting an access control policy which controls the execution of data-oriented transactions in-line with the sensitivity associated data-oriented transactions requesting access to the sensitive computer-based resources or the security-context associated with the sensitive computer-based resources.

Further, the flow corresponding to the execution of the method reaches the step 114 only in an event the policy stores is determined, subsequent to the execution of the look-up operation thereupon, to incorporate at least one access control policy that either refers (partially or entirely) to the data-oriented transactions or the computer-based resources requested access to, by the said data-oriented transactions, or at least partially controls the execution of data-oriented transactions based on the sensitivity associated with the data-oriented transactions (requesting access to the sensitive computer-based resources) or the security-context associated with the sensitive computer-based resources, then such an access control policy is selectively modified, dynamically and in real-time, such that the modified access control policy refers entirely and exclusively to the data-oriented transactions (requesting access to sensitive computer-based resources) and to the sensitive computer-based resources (requested access to, by the said data-oriented transactions). Further, the said access control policy is also modified, albeit selectively, and rendered (entirely) in-line with the sensitivity associated with the data-oriented transactions and the security-context associated with the sensitive computer-based resources.

Referring again to step 112, if it is determined (at step 112) that the policy store does not incorporate at least one access control policy that either references the data-oriented transactions requesting access to sensitive computer-based resources or the sensitive computer-resources requested access to, or at least partially controls the execution of data-oriented transactions based on the sensitivity associated with the data-oriented transactions or the security-context associated with the sensitive computer-based resources, or both, then the flow corresponding to the execution of the method reaches the step 116, it which a new access control policy exclusively referencing the data-oriented transactions (requesting access to sensitive computer-based resources) and the sensitive computer-based resources (requested access to, by the said data-oriented transactions) is created. The new access control policy is configured such that it controls, at least partially and preferably entirely, the execution of the data-oriented transactions based either on the sensitivity associated with the data-oriented transactions or on the security-context associated with the sensitive computer-based resources, or both. Additionally, at step 116, the newly created access control policy is also rendered responsive to and in-line with the sensitivity associated with the data-oriented transactions and the security-context associated with the sensitive computer-based resources.

In accordance with the present disclosure, the newly created access control policy, which exclusively references the data-oriented transactions (requesting access to sensitive computer-based resources) and the sensitive computer-based resources (requested access to, by the said data-oriented transactions), and which is responsive to and in-line with the sensitivity associated with the data-oriented transactions and the security-context associated with the sensitive computer-based resources, is executed in real-time to provide the said data-oriented transactions with controlled access to the corresponding sensitive computer-based resources, in strict compliance with the sensitivity associated with the data-oriented transactions and the security-context associated with the sensitive computer-based resources.

Considering that the access control policy (the modified access control policy as well as the newly created access control policy) is generated on the basis of the sensitivity associated with the data-oriented transactions as well as the security-context associated with the computer-based resources requested access to, by the said data-oriented transactions, the (modified or newly created) access control policy, when implemented, triggers the sensitive data-oriented transactions, during the implementation thereof, to access (and to also communicate with) only those computer-based resources having a relevant and appropriate security context.

Figure 2:
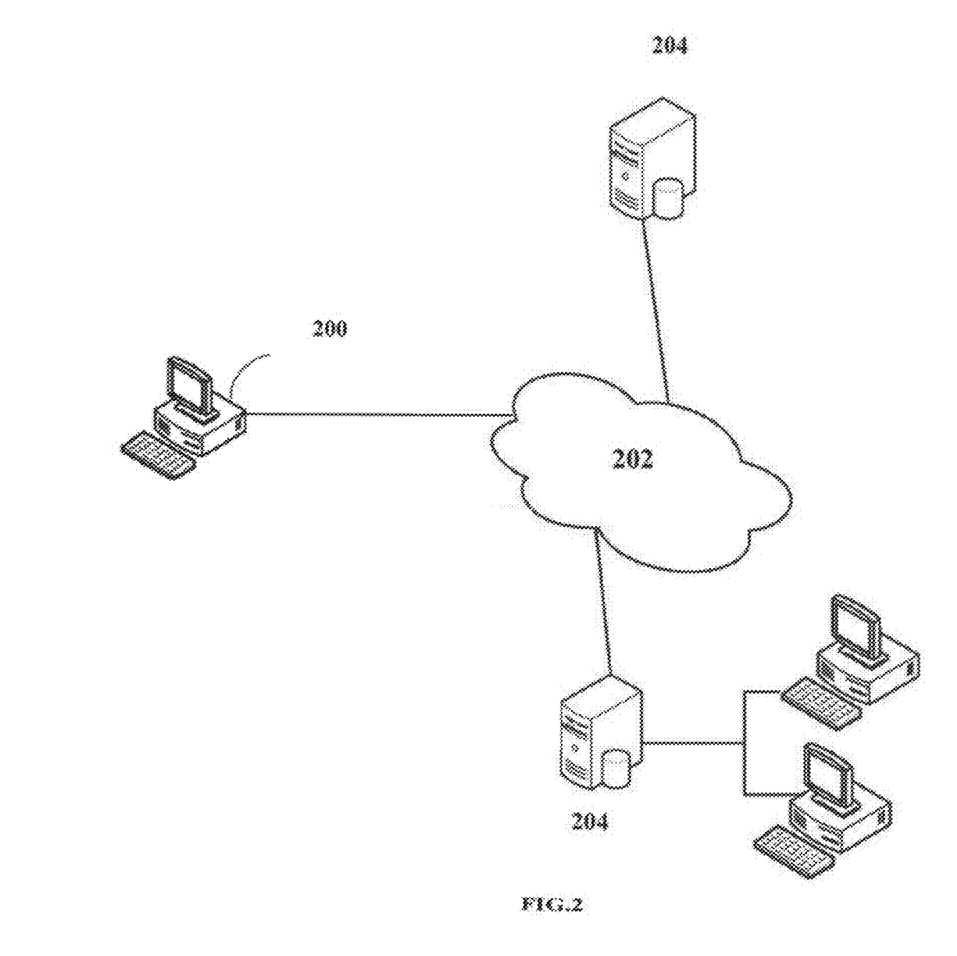
FIG. 2 is a system-level block diagram depicting a computer-based device programmatically configured to execute the steps described in FIG. 1A and FIG. 1B.

FIG. 2 describes yet another embodiment of the present disclosure wherein the steps 100-116 described above are executed on a computer-based device 200 which has been programmatically configured to execute a source program code forming at least a part of a distributed (software) application. As illustrated in FIG. 2, the computer-based device 200 is connected to a plurality of sensitive computer-based devices 202 via (the) predesignated computer network 204. Further, FIG. 2 also depicts a plurality of computer-based devices 200A-200D communicably coupled to the computer-based device 200 via the computer network 204, and executing, preferably in parallel and at least in part, the distributed (software) application, and consequentially the software program code (which, as described in the above paragraphs, forms at least a part of the distributed software application).

In yet another embodiment of the present disclosure, the logic necessary for executing the steps 100-116 is metamorphosed as computer-executable instructions, and the said computer-executable instructions are embedded onto a non-transitory computer-readable storage medium which when read by a computer processor, preferably embodied within the computer-based device 200, facilitates (the) implementation of the steps 100-116 on the computer processor.

TECHNICAL ADVANTAGES

The technical advantages envisaged by the present disclosure include the realization of a computer-implemented system and method for instrumenting a computer program code and generating Rule Based Access Control policies based on the instrumented computer program code. The system and method incorporate access control policies which are configured preferably at run-time, dynamically, to control the implementation of predetermined data-oriented transactions. Preferably, the access control policies are configured to grant the said data-oriented transactions with selective and controlled access to predetermined computer-based resources based on the sensitivity determined to be associated with each of the said computer-based resources. The system and method envisaged by the present disclosure provide for the (pre)existing access control policies to be reconfigured, preferably dynamically and at run-time, in order to suit the sensitivity of the (computer-based) resources as well as the access privileges determined to be associated with the data-oriented transactions requesting access to such resources. By facilitating dynamic reconfiguration of the access control policies, the system and method envisaged by the present disclosure account for any (last moment) changes in the sensitivity of the resources as well as the access privileges determined to be associated with the data-oriented transactions requesting access to such resources. In this manner, any changes in respect of the status (sensitivity) of the resources and any changes (access privileges) in respect of the data-oriented transactions are accurately and consistently tracked and recorded.

The system and method envisaged by the present disclosure divide a source program code down to a plurality of, preferably interrelated and interconnected data-oriented transactions, such that the access control policies could be applied in a granularized manner to the last possible unit (i.e., an individual data-oriented transaction) of the source program code. Further, the system and method of the present disclosure, given the fact that they envisage instrumenting the bytecode, are independent of the underlying source program code and the machine executing the source program code. Additionally, the system and method of the present disclosure are configured to be incorporated as an add-on to an existing application program (or a set of application programs), thereby necessitating no dedicated efforts—directed towards the implementation of instrumentation—during the development of the application program.

What is claimed is:

1. A computer implemented method for instrumenting a computer program code and generating rule based access control policies based on instrumented computer program code, said method comprising the following computer implemented steps:
   launching the computer program code;
   examining an intermediary class file comprising byte code corresponding to the computer program code, and identifying at least one instrumentation point on a byte code execution stream corresponding to the computer program code, for insertion of at least one instrumentation probe thereto;

programmatically inserting said at least one instrumentation probe into said instrumentation point on said byte code execution stream, and creating an execution-trace corresponding to the computer program code, beginning from said instrumentation point;

creating a virtual transaction stack based on said execution-trace, and configuring said virtual transaction stack to incorporate information describing at least an execution flow of the computer program code, and further configuring said virtual transaction stack to identify at least logical boundaries corresponding to said execution flow of the computer program code, and further configuring said virtual transaction stack to incorporate information corresponding to different data-oriented operations performed on each side of said logical boundaries;

identifying, based on an analysis of said virtual transaction stack, at least computer-based resources operated upon by data-oriented transactions forming at least a part of said byte code execution stream, and further determining a security-context associated with each of said computer-based resources;

determining, based on said security context associated with each of said computer-based resources, sensitivity of each of said data-oriented transactions;

accessing a policy store pre-designated for storing access control policies, and determining whether said policy store incorporates at least one access control policy governing, at least in part, execution of said data-oriented transactions on said computer-based resources, and generated at least partially based on said sensitivity and said security context determined to be associated with said data-oriented transactions and said computer-based resources respectively;

in an event said policy store is determined to be incorporating said at least one access control policy, selectively modifying said at least one access control policy based at least on said security-context and said sensitivity, such that modified access control policy, upon implementation, provides in real-time, said data-oriented transactions with controlled access to said computer-based resources in-line with said security-context and said sensitivity; and in an event said policy store is determined as not incorporating said access control policy, triggering creation of at least one new rule-based access control policy based on said security-context and said sensitivity, for governing execution of said data-oriented transactions on said computer-based resources, such that said new rule-based access control policy upon implementation provides, in real-time, said data-oriented transactions with controlled access to said computer-based resources, in-line with said security context and said sensitivity associated with said data-oriented transactions and said computer-based resources respectively.

2. The method as claimed in claim 1, wherein the step of identifying at least one instrumentation point on the byte code execution stream, further includes the step of identifying at least one of a package, class, method, and a line of the byte code execution stream corresponding to the computer program code, for insertion of the instrumentation probe thereto.

3. The method as claimed in claim 1, wherein the step of identifying at least one instrumentation point on the byte code execution stream for inserting at least one instrumentation probe, further includes the step of identifying a point on the byte code execution stream prior to execution of a method call, as said at least one instrumentation point.

4. The method as claimed in claim 3, wherein the step of identifying at least one instrumentation point on the byte code execution stream for inserting at least one instrumentation probe, further includes the step of identifying a point on the byte code execution stream following the execution of said method call, as said at least one instrumentation point.

5. The method as claimed in claim 1, wherein the step of configuring said virtual transaction stack to identify logical boundaries corresponding to the execution flow of the computer program code, further includes the step of configuring said virtual transaction stack to identify said logical boundaries throughout an execution of the computer program code as a distributed application across a plurality of computer-based devices, and the step of further configuring said virtual transaction stack to incorporate information corresponding to different data-oriented operations performed on each side of the logical boundaries created throughout said distributed application.

6. A computer implemented system for instrumenting a computer program code and generating rule based access control policies based on instrumented computer program code, said system comprising:

a processor;

at least one memory module communicably coupled to said processor and storing computer program instructions for byte code instrumentation, said processor configured to execute said computer program instructions for byte code instrumentation on a computer-based device, and cause the processor to:

launch the computer program code on said computer-based device;

examine an intermediary class file comprising byte code corresponding to the computer program code, and identify at least one instrumentation point on a byte code execution stream corresponding to the computer program code, for insertion of at least one instrumentation probe thereto;

insert said at least one instrumentation probe into said instrumentation point on said byte code execution stream, and create an execution-trace corresponding to the computer program code, beginning from said instrumentation point;

create a virtual transaction stack based on said execution-trace, and configure said virtual transaction stack to incorporate information describing at least an execution flow of the computer program code, and further configure said virtual transaction stack to identify at least logical boundaries corresponding to said execution flow of the computer program code, and further configure said virtual transaction stack to incorporate information corresponding to different data-oriented operations performed on each side of said logical boundaries;

identify, based on an analysis of said virtual transaction stack, at least computer-based resources operated upon by data-oriented transactions forming a part of said byte code execution stream, and further determine a security-context associated with each of said computer-based resources;

determine, based on said security context information associated with each of said computer-based resources, sensitivity of each of said data-oriented transactions;

access a policy store pre-designated for storing access control policies, and determine whether said policy store incorporates at least one access control policy governing, at least in part, execution of said data-oriented transactions on said computer-based resources, and generated at least partially based on said sensitivity and said security context determined to be associated with said data-oriented transactions and said computer-based resources respectively;

in an event said policy store is determined to be incorporating said at least one access control policy, selectively modify said at least one access control policy based at least on said security-context and said sensitivity, such that said at least one access control policy, upon implementation provides, in real-time, said data-oriented transactions with controlled access to said computer-based resources in-line with said security-context and said sensitivity;

in an event said policy store is determined as not incorporating said access control policy, trigger creation of at least one new rule-based access control policy based on said security-context and said sensitivity, for governing execution of said data-oriented transactions on said computer-based resources, such that said new rule-based access control policy upon implementation provides, in real-time, said data-oriented transactions with controlled access to said computer-based resources, in-line with said security context information and sensitivity associated with said data-oriented transactions and said computer-based resources respectively.

7. The system as claimed in claim 6, wherein the processor is further configured to identify at least one of a package, class, method, and a line of the byte code execution stream corresponding to the computer program code, for insertion of the instrumentation probe thereto.

8. The system as claimed in claim 6, wherein the processor is further configured to identify a point on the byte code execution stream prior to execution of a method call, as said at least one instrumentation point.

9. The system as claimed in claim 6, wherein the processor is further configured to identify a point on the byte code execution stream following execution of said method call, as said at least one instrumentation point.

10. The system as claimed in claim 6, wherein said virtual transaction stack is further configured to identify said logical boundaries throughout an execution of the computer program code as a distributed application across a plurality of computer-based devices, said virtual transaction stack still further configured to incorporate information corresponding to different data-oriented operations performed on each side of the logical boundaries created across the distributed application.

11. A non-transitory computer readable storage medium having computer executable instructions embedded thereupon, said computer executable instructions, when executed by a computer processor, cause the computer processor to:
  launch the computer program code on a computer-based device;
  examine an intermediary class file comprising byte code corresponding to the computer program code, and identify at least one instrumentation point on a byte code execution stream corresponding to the computer program code, for insertion of at least one instrumentation probe thereto;
  insert said at least one instrumentation probe into said instrumentation point on said byte code execution stream, and create an execution-trace corresponding to the computer program code, beginning from said instrumentation point;
  create a virtual transaction stack based on said execution-trace, and configure said virtual transaction stack to incorporate information describing at least an execution flow of the computer program code, and further configure said virtual transaction stack to identify at least logical boundaries corresponding to said execution flow of the computer program code, and further configure said virtual transaction stack to incorporate information corresponding to different data-oriented operations performed on each side of said logical boundaries;
  identify, based on an analysis of said virtual transaction stack, at least computer-based resources operated upon by data-oriented transactions forming a part of said byte code execution stream, and further determine a security-context associated with each of said computer-based resources;
  determine, based on said security context information associated with each of said computer-based resources, sensitivity of each of said data-oriented transactions;
  access a pre-designated policy store, and determine whether said policy store incorporates at least one access control policy governing, at least in part, execution of said data-oriented transactions on said computer-based resources, and generated at least partially based on said sensitivity and said security context determined to be associated with said data-oriented transactions and said computer-based resources respectively;
  in an event said policy store is determined to be incorporating said at least one access control policy, selectively modify said at least one access control policy based at least on said security-context and said sensitivity, such that said at least one access control policy, upon implementation, provides, in real-time, said data-oriented transactions with controlled access to said computer-based resources in-line with said security-context and said sensitivity; and
  in an event said policy store is determined as not incorporating said access control policy, trigger creation of at least one new rule-based access control policy based on said security-context and said sensitivity, for governing execution of said data-oriented transactions on said computer-based resources, such that said new rule-based access control policy upon implementation provides, in real-time, said data-oriented transactions with controlled access to said computer-based resources, in-line with said security context information and said sensitivity associated with said data-oriented transactions and said computer-based resources respectively.

12. The non-transitory computer readable storage medium as claimed in claim 11, wherein the computer readable instructions, when executed by the computer processor, further cause the computer processor to:
  identify at least one of a package, class, method, and a line of the byte code execution stream corresponding to the computer program code, for insertion of the instrumentation probe thereto;
  identify a point on the byte code execution stream prior to execution of a method call, as said at least one instrumentation point;

identify a point on the byte code execution stream following execution of said method call, as said at least one instrumentation point; and configure said virtual transaction stack to identify said logical boundaries across the computer program code executed as a distributed application, and configure said virtual transaction stack to incorporate information corresponding to different data-oriented operations performed on each side of the logical boundaries created across the distributed application executed on a plurality of computer-based devices.

* * * * *